United States Patent
Nozaki et al.

(10) Patent No.: US 8,990,523 B1
(45) Date of Patent: Mar. 24, 2015

(54) STORAGE APPARATUS AND ITS DATA PROCESSING METHOD

(71) Applicant: Hitachi, Ltd., Tokyo (JP)

(72) Inventors: Yuri Nozaki, Tokyo (JP); Masanobu Ikeda, Tokyo (JP); Hitoshi Fukuguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/352,486

(22) PCT Filed: Sep. 2, 2013

(86) PCT No.: PCT/JP2013/073539
§ 371 (c)(1),
(2) Date: Apr. 17, 2014

(51) Int. Cl.
*G06F 12/02* (2006.01)

(52) U.S. Cl.
CPC .... *G06F 12/0246* (2013.01); *G06F 2212/2022* (2013.01); *G06F 2212/7208* (2013.01)
USPC ............... 711/158; 711/103; 711/170

(58) Field of Classification Search
CPC ................................ G06F 2212/72–2212/7211
See application file for complete search history.

(56) References Cited

U.S. PATENT DOCUMENTS

| 2010/0005228 | A1 | 1/2010 | Fukutomi et al. |
| 2011/0072192 | A1* | 3/2011 | Sartore ........................ 711/103 |
| 2013/0046945 | A1 | 2/2013 | Abe et al. |
| 2014/0211634 | A1* | 7/2014 | Matthews et al. ............ 370/241 |

FOREIGN PATENT DOCUMENTS

| JP | 11-025574 A | 1/1999 |
| JP | 2007-180610 A | 7/2007 |
| JP | 2010-015516 A | 1/2010 |
| JP | 2012-243018 A | 12/2012 |
| JP | 2013-041394 A | 2/2013 |
| WO | 2012/132408 A1 | 10/2012 |

\* cited by examiner

*Primary Examiner* — Aimee Li
*Assistant Examiner* — Nicholas Simonetti
(74) *Attorney, Agent, or Firm* — Volpe and Koenig, P.C.

(57) ABSTRACT

A storage apparatus has a controller for controlling data input to and output from a plurality of storage devices composed of flash memories and the controller manages the number of times data are written to each storage device on the basis of each storage device, wherein when the controller receives a write command from an access requestor and if any of the storage devices is a storage device whose number of times of data write exceeds a threshold value, the controller determines that the data write mode is an intensive mode, selects the storage device, whose number of times of data write exceeds the threshold value, as a specified storage device and writes data, which are to be processed for the write command, intensively to the selected specified storage device.

8 Claims, 10 Drawing Sheets

| DRIVE NUMBER 200A | NUMBER OF TIMES OF WRITE 200B | DRIVE TYPE 200C | WRITE RATIO 200D | PARITY GROUP NUMBER 200E | UNUSED AREA BLOCK ADDRESS 200F | NUMBER-OF-TIMES-OF-WRITE COUNTER 200G |
|---|---|---|---|---|---|---|
| 0 | 9200 | DRIVE 1 | 92% | 1 | 0x0AAA | 2 |
| 1 | 8000 | DRIVE 1 | 80% | 1 | 0x0999 | 1 |
| 2 | 8600 | DRIVE 1 | 86% | 1 | 0x0777 | 1 |
| 3 | 7700 | DRIVE 1 | 77% | 1 | 0x0888 | 1 |
| 4 | 4000 | DRIVE 2 | 4% | 2 | 0x0BBB | 1 |
| 5 | 3500 | DRIVE 2 | 3.5% | 2 | 0x0EEE | 1 |
| ... | ... | ... | ... | ... | ... | ... |

| DRIVE TYPE | UPPER LIMIT NUMBER OF TIMES OF WRITE |
|---|---|
| DRIVE 1 | 10000 |
| DRIVE 2 | 100000 |
| DRIVE 3 | 5000 |
| ⋮ | ⋮ |

(b)

| PARITY GROUP NUMBER | PARITY GROUP INTENSIVE MODE FLAG | PARITY GROUP COUNTER |
|---|---|---|
| 1 | 1 | 5 |
| 2 | 0 | 0 |
| 3 | 0 | 0 |
| ⋮ | ⋮ | ⋮ |

FIG. 6

| ITEM | SET VALUE |
|---|---|
| 510 — INTENSIVE SWITCHING THRESHOLD VALUE | 90% |
| 520 — INTENSIVE RATIO PATTERN | a |
| 530 — INTENSIVE DRIVE RATIO | 2 |
| 540 — NON-INTENSIVE DRIVE RATIO | 1 |
| 550 — POST-DRIVE-REPLACEMENT OPERATION POLICY | B |

STORAGE APPARATUS AND ITS DATA PROCESSING METHOD

TECHNICAL FIELD

The present invention relates to a storage apparatus for controlling data input to and output from storage devices using flash memories as storage media, and a data processing method for the storage apparatus.

BACKGROUND ART

When storage drives which use flash memories (such as flash drives) are used as storage media for a storage apparatus and if the number of times of data write exceeds an upper limit value, the storage devices no longer operate properly and it becomes necessary to replace the storage devices as they have reached the end of their lives. Therefore, data are distributed and written to a plurality of storage devices, thereby lengthening the lives of the individual storage devices and the life of the entire storage system including the storage devices.

However, if data are distributed and written to the plurality of storage devices, the lives of the respective storage devices are equalized, thereby resulting in a situation where the plurality of storage devices need to be replaced at the same time; and since a plurality of processing sequences for dynamic sparing occur as processing for saving data stored in each storage device, which is a target to be replaced, to a spare storage device, so that performance of the storage system degrades.

Incidentally, Patent Literature 1 discloses a technique that prevents a plurality of storage media from reaching an upper limit of the number of times of write at the same time by replacing a normal disk with a spare disk as the need arises.

CITATION LIST

Patent Literature

[Patent Literature 1] Japanese Patent Application Laid-Open (Kokai) Publication No. 2013-41394

SUMMARY OF INVENTION

Problems to be Solved by the Invention

Since the technique described in Patent Literature 1 does not assume distribution of data when writing them to each storage device, it has a problem of shortening the life of each storage device. With the conventional technology, even if data are distributed when written to each storage device, it is impossible to lengthen the life of each storage device and prevent the plurality of storage devices from reaching the end of their lives at the same time.

The present invention was devised in light of the problem of the conventional technology and it is an object of the invention to provide a storage apparatus capable of maintaining the lives of the respective storage devices for long periods of time on the basis of distribution of data to be written to the storage devices and preventing the plurality of storage devices from reaching the end of their lives at the same time.

Solution to Problem

In order to solve the above-described problem, the present invention provides a storage apparatus including: a plurality of storage devices composed of flash memories; and a controller for controlling data input to and output from the plurality of storage devices based on access from an access requestor, wherein when receiving a write command from the access requestor, the controller judges whether a data write mode to be processed for the write command is a normal mode to execute control for distributing and writing the data to each storage device or an intensive mode to execute control for writing the data intensively to a specified storage device among the plurality of storage devices; and if it is determined that the data write mode is the intensive mode, the controller selects a storage device, which is to become a processing target in the intensive mode, as the specified storage device from among the plurality of storage devices and writes data, which are to be processed for the write command, intensively to the selected specified storage device.

Advantageous Effects of Invention

According to the present invention, it is possible to maintain the lives of the respective storage devices for long periods of time and prevent the plurality of storage devices from reaching the end of their lives at the same time.

BRIEF DESCRIPTION OF DRAWINGS

FIG. 4 is a configuration diagram of a drive management table.

FIG. 5(*a*) is a configuration diagram of a drive type management table and FIG. 5(*b*) is a configuration diagram of an intensive mode management table.

FIG. 6 is a configuration diagram of a setting management table.

DESCRIPTION OF EMBODIMENTS

Figure 1:
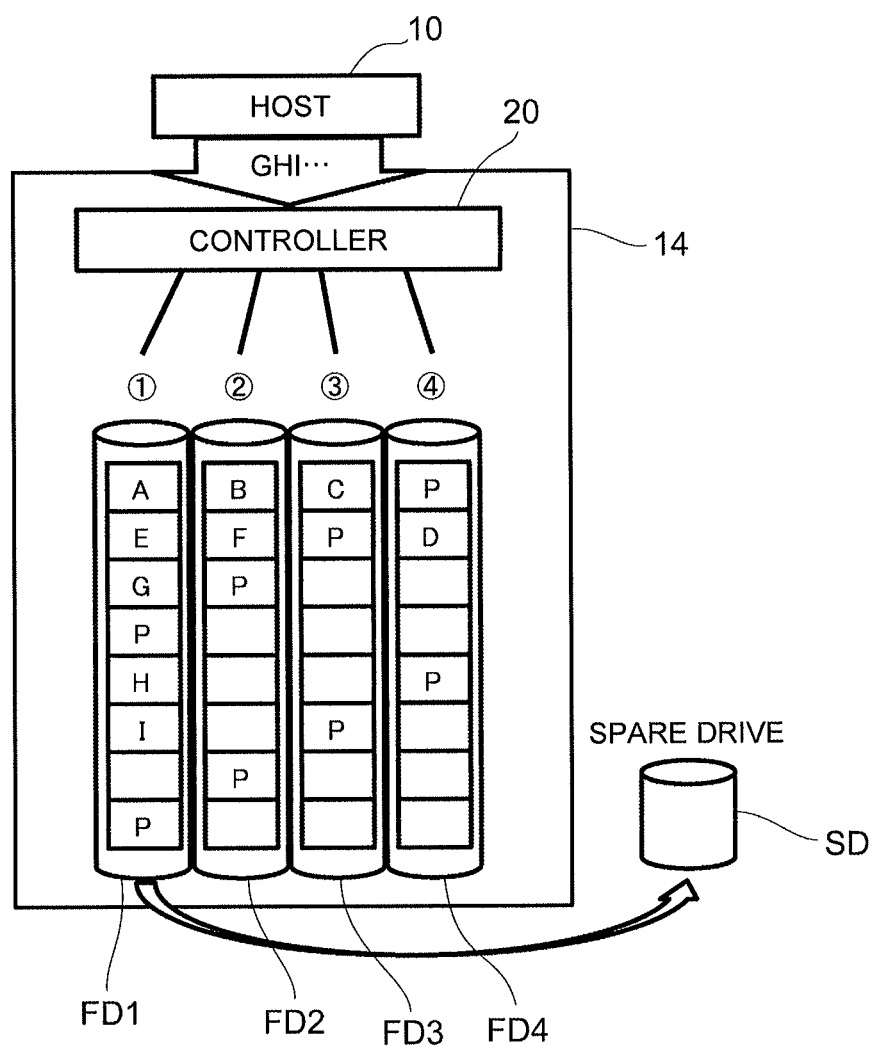
FIG. 1 is a conceptual diagram for explaining the concept of the present invention.

FIG. 1 is a conceptual diagram for explaining the concept of the present invention. Referring to FIG. 1, a storage apparatus 14 for sending and receiving information to and from a host (host computer) 10 via a network includes a plurality of storage devices composed of flash memories, such as flash SSDs (Solid State Drives: hereinafter referred to as the flash drives) FD1, FD2, FD3, FD4, and a controller 20 for controlling data input to and output from each flash drive FD1 to FD4. When the controller 20 receives a write command from the host 10 which is an access requestor, it judges whether a data write mode to process data according to this write command is a normal mode to execute control for distributing and writing data to each flash drive FD1 to FD4 or an intensive mode to execute control for writing data intensively to a specified flash drive among the plurality of flash drives FD1 to FD4.

If it is determined here that the data write mode is the normal mode and, for example, if data to be processed for the write command received from the host 10 are "A," "B," "C," "D," "E," "F," the controller 20 distributes and writes the write data "A," "B," and "C" to data blocks respectively in the flash drives FD1, FD2, FD3 and also writes parity data "P" to a data block in the flash drive FD4. Furthermore, the controller 20 writes the write data "D" to a data block in the flash drive FD4 and writes the parity data "P" in a data block in the flash drive FD3, writes the write data "E" to a data block in the flash drive FD1, and writes the write data "F" to a data block in the flash drive FD2 in a distributed manner.

Meanwhile, when the controller 20 receives the write command from the host 10 and determines that, for example, the number of times of write of the flash drive FD1 exceeds a threshold value (a judgment value for switching the write mode) and the write mode is the intensive mode, the controller 20 selects the flash drive FD1 as a flash drive to be a processing target in the intensive mode and writes the write data "G," "H," "I," among the data to be processed for the received write command, to a data block of the selected flash drive FD1 intensively. Incidentally, in this case, regarding the parity data, the controller 20 writes the parity data for the write data "G," "H," "I" to data blocks in the flash drives FD2, FD4, and FD3. Specifically speaking, regarding the parity data "P," the controller 20 sequentially distributes and writes them to the data blocks of the respective flash drives FD1 to FD4.

Subsequently, if the data write mode is the intensive mode, the controller 20 executes writing of the write data intensively to the flash drive FD1. Accordingly, in the normal mode, the write data are distributed and written to data blocks in the respective flash devices FD1 to FD4; and in the intensive mode, the write data are written intensively to a data block of the specified flash drive FD1. So, it is possible to maintain the life of the entire storage apparatus 14 for long periods of time and prevent the plurality of flash drives from reaching the end of their lives at the same time.

Moreover, if the number of times of write of the flash drive FD1 exceeds the threshold value for switching the write mode and reaches a value indicating its life, dynamic sparing processing (processing executed, when the number of times of errors with respect to a certain storage device reaches a threshold value or the number of times of write of that storage device reaches a threshold value, for saving data, which are stored in the relevant storage device, to a spare storage device before the relevant storage device is blocked) is executed on the flash drive FD1 and data stored in the flash drive FD1 are saved to the spare drive SD. Then, the flash drive FD1 is replaced with a new flash drive (new storage device).

Regarding the new flash drive, on condition that the number of times of write exceeds the threshold value, the new flash drive can be selected as a flash drive to be a processing target in the intensive mode and the write data, among the data to be processed for the write access, can be written intensively to the selected new flash drive. Moreover, regarding the new flash drive, the new flash drive can be selected as a flash drive to be the processing target in the intensive mode after the drive replacement and the write data, among the data to be processed for the write access, can be written intensively to the selected new flash drive.

Examples

Figure 2:
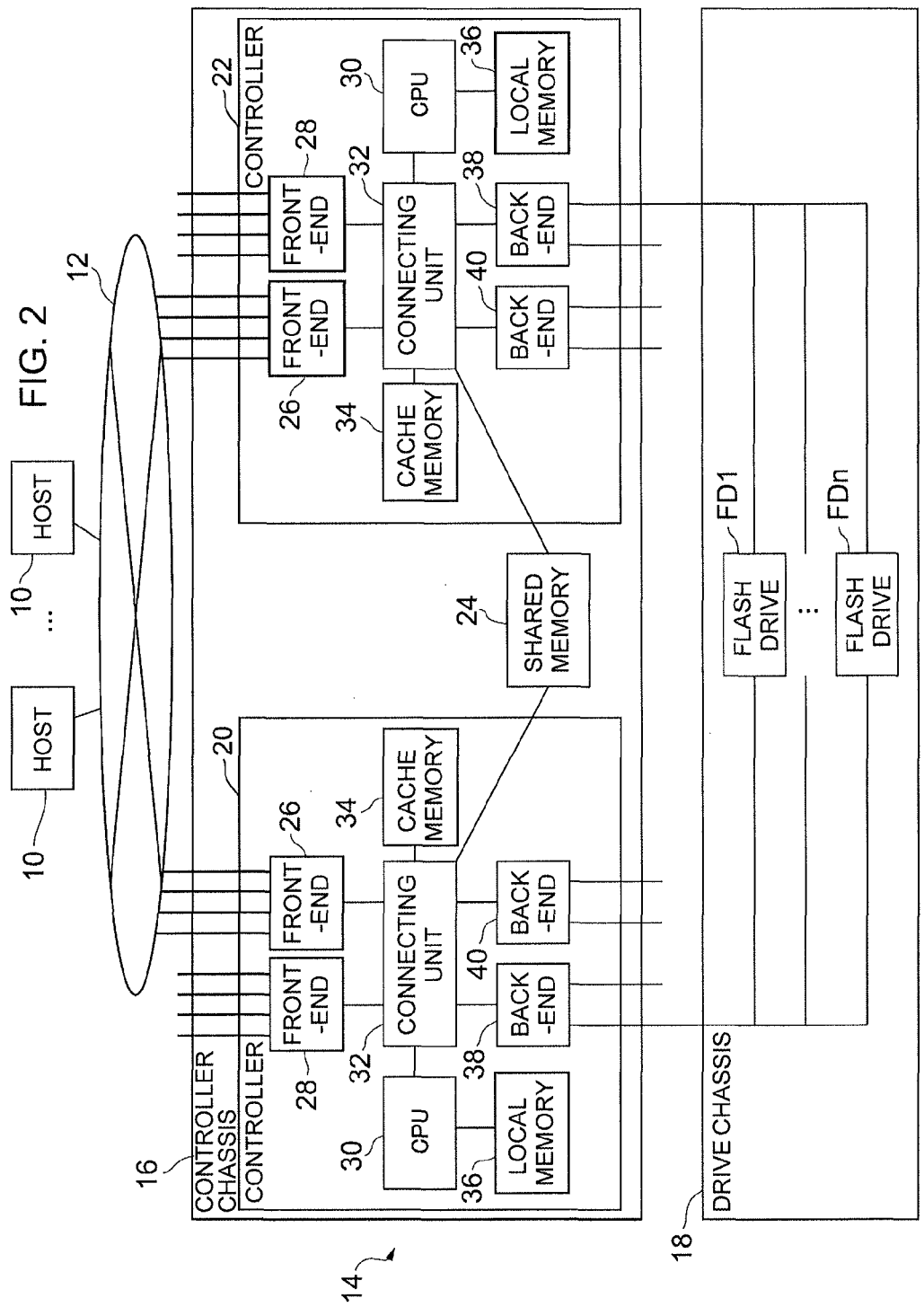
FIG. 2 is an overall configuration diagram for explaining the overall configuration of a storage system.

FIG. 2 is an overall configuration diagram of a storage system. Referring to FIG. 2, the storage system includes a plurality of hosts 10, a network 12, and a storage apparatus 14 and each host 10 is connected to the storage apparatus 14 via the network 12.

The storage apparatus 14 includes a controller chassis 16 and a drive chassis 18. The controller chassis 16 contains controllers 20, 22 and also contains a shared memory 24. The drive chassis 18 contains, for example, a plurality of flash drives FD1 to FDn as storage devices.

Each host 10 is a computer device equipped with information processing resources such as a CPU (Central Processing Unit), a memory, and an input/output interface and is configured as a personal computer, a workstation, or a mainframe.

Each host 10 can access a designated logical volume by issuing an access request (command), such as a write request (write command) or a read request (read command), which designates the logical volume provided by the storage apparatus 14. When this happens, an LUN (Logical Unit Number) and an LBA (Logical Block Address) can be added as information for specifying the logical volume to the access request.

As the network 12, for example, a SAN (Storage Area Network), a LAN (Local Area Network), the Internet, private lines, or public lines can be used. Incidentally, for example, an operation terminal or management server that is configured as a computer device equipped with information processing resources such as a CPU, a memory, and an input/output interface may be connected to the network 12.

The controller 20 includes a plurality of front-ends (FE) 26, 28, a CPU 30, a connecting unit 32, a cache memory 34, a local memory 36, and a plurality of back-ends (BE) 38, 40; and the front-end 26 is connected to the network 12 and the back-end 38 is connected to each flash drive FD1 to FDn. Under this circumstance, when receiving a write command or a read command from each host 10, the controller 20 functions as a control unit for analyzing the content of the received write command or read command and controlling data input to and output from each flash drive FD1 to FDn based on the analysis results.

For example, when receiving the write command from the host 10, the controller 20 judges whether a data write mode to be processed for the write command is a normal mode to execute control for distributing and writing data to each flash drive FD1 to FDn or an intensive mode to execute control for writing the data intensively to a specified flash drive among the plurality of flash drives FD1 to FDn; and if it is determined that the data write mode is the intensive mode, the controller 20 selects a flash drive, which is to be the processing target in the intensive mode, as the specified flash drive from among the plurality of flash drives FD1 to FDn and writes the data, which are to be processed for the write command, intensively to the selected specified flash drive.

Under this circumstance, the controller 20 manages the number of times the data are written to each flash drive FD1 to FDn on the basis of each flash drive FD1 to FDn; and when the controller 20 receives a write command and if any of the flash drives is a flash drive whose number of times of data write exceeds a preset threshold value, the controller 20 determines that the data write mode is the intensive mode, and selects the flash drive, whose number of times of data write exceeds the preset threshold value, as the specified flash drive.

Moreover, the controller 20 manages the number of times the data are written to each flash drive FD1 to FDn on the basis of each flash drive FD1 to FDn and also manages unused areas (data blocks) of each flash drive FD1 to FDn on the basis of each flash drive FD1 to FDn; and when the controller 20 receives a write command and if any of the flash drives is a flash drive whose number of times of data write exceeds a preset threshold value, the controller 20 determines that the data write mode is the intensive mode, selects the flash drive, whose number of times of data write exceeds the preset threshold value, as the specified flash drive, searches for an unused area of the selected specified flash drive, and writes the write data, which are to be processed for the write command, intensively to the unused area obtained by the search.

Furthermore, when a plurality of pieces of write data and parity data exist as the data to be processed for the write command and if it is determined that the data write mode is the intensive mode, the controller 20 writes the write data intensively to the specified flash drive and distributes and writes the parity data to each flash drive FD1 to FDn.

Incidentally, the controller 22, like the controller 20, includes a plurality of front-ends (FE) 26, 28, a CPU 30, a connecting unit 32, a cache memory 34, a local memory 36, and a plurality of back-ends (BE) 38, 40; and when receiving a write command or a read command from each host 10, the controller 22 functions as a control unit for analyzing the content of the received write command or read command and controlling data input to and output from each flash drive FD1 to FDn based on the analysis results.

The shared memory 24 functions as a memory unit for storing information about, for example, programs shared by the controllers 20, 22. The front-end 26 is configured as an interface unit for sending and receiving information to and from each host 10 via the network 12.

The CPU 30 functions as a processor for supervising and controlling the entire controller 20; and when receiving a write command or a read command from the host 10, the CPU 30 executes data input/output processing based on the received write command or read command and also executes, for example, frame conversion processing added to the write command or the read command.

The connecting unit 32 is connected to each front-end 26, 28 and each back-end 38, 40 and also connected to the CPU 30 and the cache memory 34, and is connected via the shared memory 24 to the connecting unit 32 for the controller 22. Under this circumstance, the connecting unit 32 functions as a switch for mutually connecting the respective components.

The cache memory 34 functions as a data memory unit for temporarily storing data which are processing targets of the CPU 30. The local memory 36 functions as a memory unit for storing information about, for example, programs to be activated by the CPU 30. The back-end 38 is configured as an interface unit for sending and receiving data to and from each flash drive FD1 to FDn via an internal network (not shown).

Moreover, it is also possible to configure RAID (Redundant Array of Inexpensive Disks) groups such as RAID4, RAID5, and RAID6 with the respective flash drives FD1 to FDn or divide each flash drive FD1 to FDn into a plurality of RAID groups. Under this circumstance, it is also possible to form a plurality of logical units (hereinafter sometimes referred to as LU(s) (Logical Unit(s)) and a plurality of logical volumes in physical storage areas of each flash drive FD1 to FDn.

Figure 3:
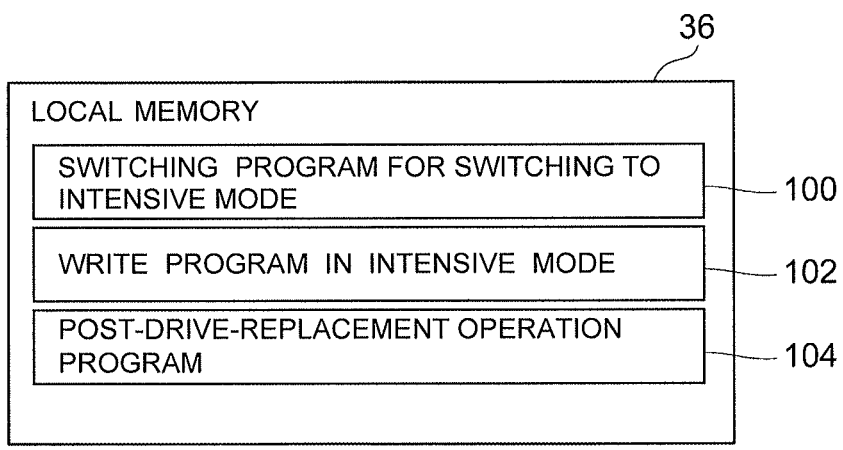
FIG. 3(*a*) is a configuration diagram of a local memory and FIG. 3(*b*) is a configuration diagram of a shared memory.
Figure 3:
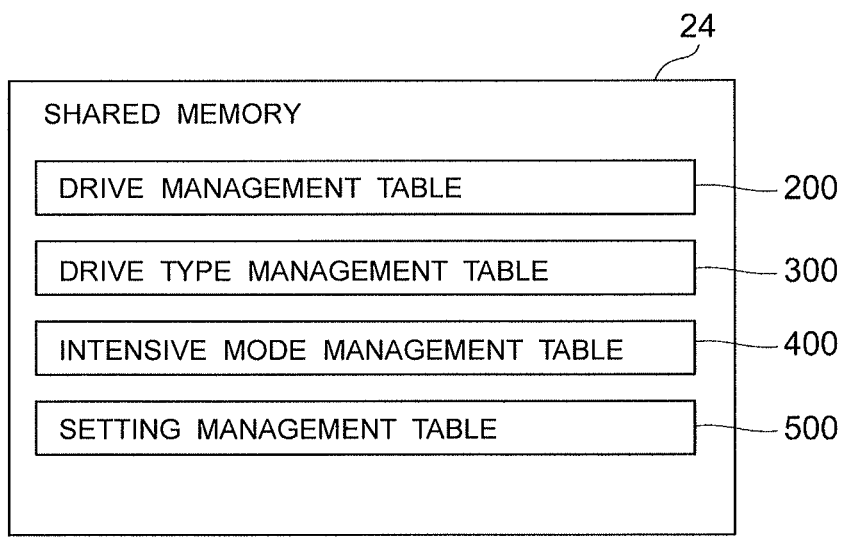

FIG. 3 is a configuration diagram of the local memory and the shared memory. Referring to FIG. 3(a), the local memory 36 stores a switch program 100 for switching to the intensive mode, a write program 102 in the intensive mode, and a post-drive-replacement operation program 104 as programs to be executed by the CPU 30.

The switch program 100 for switching to the intensive mode is a program used by the CPU 30 to switch from the normal mode to the intensive mode. The write program 102 in the intensive mode is a program executed by the CPU 30 to write the write data intensively to the specified flash drive in the intensive mode. The post-drive-replacement operation program 104 is a program executed by the CPU 30 for judgment of a post-drive-replacement operation policy and mode switching after the relevant flash drive is replaced with a new flash drive.

Referring to FIG. 3(b), the shared memory 24 stores a drive management table 200, a drive type management table 300, an intensive mode management table 400, and a setting management table 500 as tables managed by the CPU 30.

FIG. 4 is a configuration diagram of the drive management table. Referring to FIG. 4, the drive management table 200 is a table for the CPU 30 to manage each flash drive FD1 to FDn and is constituted from a drive number field 200A, a number-of-times-of-write field 200B, a drive type field 200C, a write ratio field 200D, a parity group number field 200E, an unused area block address field 200F, and a number-of-times-of-write counter field 200G.

The drive number is a number for specifying one flash drive among the flash drives FD1 to FDn. An entry of the drive number field 200A stores, for example, information "0" to "n" as the number for specifying one flash drive among the flash drives FD1 to FDn. The number of times of write is information indicating the number of times data are written to each flash drive FD1 to FDn. For example, if the number of times of write of a flash drive FD with the drive number "0" is "9200," information indicating "9200" is stored in the relevant entry of the number-of-times-of-write field 200B.

The drive type is information about the type when classifying the flash drives FD1 to FDn into a plurality of types of drives. For example, if the type of the flash drive FD with the drive number "0" is "Drive 1," information indicating "Drive 1" is stored in the relevant entry of the drive type field 200C.

The write ratio is information indicating a ratio of the number of times of write to an upper limit value of the number of times of write of each flash drive FD1 to FDn. For example, if the upper limit number of times of write of the flash drive FD with the drive number "0" is "10000" and the number of times of write is "9200," information indicating "92%" is stored in the relevant entry of the write ratio field 200D.

The parity group number is information indicating a group number when classifying each flash drive FD1 to FDn into a plurality of parity groups. For example, if flash drives with the drive number "0" to "3" belong to a parity group #1, information indicating "1" is stored, as the parity group number for these flash drives, in the relevant entry of the parity group number field 200E.

The unused area block address is information indicating a starting address of an unused area block of each flash drive FD1 to FDn. For example, if the starting address of an unused area block of the flash drive with the drive number "0" is "0x0AAA," information indicating "0x0AAA" is stored in the relevant entry of the unused area block address field 200F.

The number-of-times-of-write counter is information indicating the number of times of write (the number of times of data write) which is set to each flash drive FD1 to FDn. For example, if the number of times of write which is set to each flash drive (the drive number "0" to "3") belonging to the parity group #1 for data write processing to be executed once is "2," "1," "1," "1," information indicating "2," "1," "1," "1" is stored in the relevant entry of the number-of-times-of-write counter field 200G.

FIG. 5 is a configuration diagram of the drive type management table and the intensive mode management table. Referring to FIG. 5(a), the drive type management table 300 is a table used by the CPU 30 to manage the type of each flash drive FD1 to FDn and the upper limit value of the number of times of write and is constituted from a drive type field 300A and an upper-limit-number-of-times-of-write field 300B.

An entry of the drive type field 300A stores the same information as that stored in the drive type field 200C of the drive management table 200. The upper limit number of times of write is information indicating the upper limit value of the number of times of data write, which is set for each drive type of the flash drives FD1 to FDn. For example, regarding the flash drive whose drive type is "Drive 1," information indicating "10000" is stored in the relevant entry of the upper-limit-number-of-times-of-write field 300B.

Referring to FIG. 5(b), the intensive mode management table 400 is a table used by the CPU 30 to manage the mode and counter of each parity group in the intensive mode and is constituted from a parity group number field 400A, a parity group intensive mode flag field 400B, and a parity group counter field 400C.

An entry of the parity group number field 400A stores the same information as that of the parity group number field 200E of the drive management table 200.

The parity group intensive mode flag is information indicating whether or not to execute intensive mode processing on a flash drive belonging to a parity group. For example, if the processing in the intensive mode is to be executed on a flash drive belonging to a parity group "1," information indicating "1" is stored in the relevant entry of the parity group intensive mode flag field 400B; and if the processing in the intensive mode is not executed on a flash drive belonging to a parity group "2," information indicating "0" is stored in the relevant entry of the parity group intensive mode flag field 400B.

The parity group counter is information indicating the number of times of write of all the flash drives belonging to a parity group during the data write processing executed once. For example, if a total number of the number of times of data write to write data to the flash drives belonging to the parity group "1" is five times, information indicating "5" is stored in the relevant entry of the parity group counter field 400C.

FIG. 6 is a configuration diagram of the setting management table. Referring to FIG. 6, the setting management table 500 is table that is managed by a management server (not shown) connected to the host 10 or the network 12 and is stored in the shared memory 24; and is constituted from an item field 500A and a set value field 500B. The item includes constituted from an intensive switching threshold value 510, an intensive ratio pattern 520, an intensive drive ratio 530, a non-intensive drive ratio 540, and a post-drive-replacement operation policy 550.

The intensive switching threshold value 510 is a threshold value (judgment value) for the CPU 30 to switch the data write mode from the normal mode to the intensive mode and is a threshold value that is set in association with the data write ratio of a flash drive. For example, if the data write mode is to be switched from the normal mode to the intensive mode when the data write ratio of the flash drive exceeds "90%", information indicating "90%" is stored as the threshold value in the relevant entry of the set value 500B corresponding to this intensive switching threshold value 510.

The intensive ratio pattern 520 is patterned information indicating a ratio of the number of times data are written to an intensive flash drive, which is a target for intensive data writing by the CPU 30 in the intensive mode, to the number of times data are written to flash drives to which data are not written intensively (flash drives other than the intensive flash drive). For example, information indicating "a" or "b" is stored in the relevant entry of the set value 500B corresponding to the intensive ratio pattern 520.

For example, when flash drives belonging to a parity group consist of four flash drives and data to be processed for a write command need to be divided into five data blocks of the respective flash drives and then written five times, the set value 500B "a" corresponding to the intensive ratio pattern 520 means that the number of times the data are written to one intensive flash drive (a specified flash drive which is a target to write the data intensively) is "2" and the number of times the data are written to the other three flash drives is "1" for each drive. In this case, a ratio of the number of times the data are written to the four flash drives becomes 2:1:1:1.

Moreover, for example, when flash drives belonging to a parity group consist of four flash drives and data to be processed for a write command need to be divided into four data blocks of the respective flash drives and then written four times, the set value 500B "b" corresponding to the intensive ratio pattern 520 means that the number of times the data are written to one intensive flash drive (a specified flash drive which is a target to write the data intensively) is "3" and the number of times the data are written to the other three flash drives is "1" altogether. In this case, a ratio of the number of times the data are written to the one intensive flash drive to the number of times the data are written to the other three flash drives becomes 3:1.

The intensive drive ratio 530 is information indicating the number of times data are written to the intensive flash drive, which is the target for the CPU 30 to write the data intensively in the intensive mode, out of information indicating the ratio of the number of times the data are written to the intensive flash drive and the number of times data are written to flash drives to which data are not written intensively (the flash drives other than the intensive flash drive). For example, if "a" is stored in the relevant entry of the set value 500B corresponding to the intensive ratio pattern 520 and the ratio of the number of times the data are written to the four flash drives is "2:1:1:1," information "2" is stored in the relevant entry of the set value 500B of the intensive drive ratio 530.

The non-intensive drive ratio 540 is information indicating the number of times the data are written to the flash drives other than the intensive drive out, which is the target for the CPU 30 to write the data intensively in the intensive mode, out of the information indicating the ratio of the number of times the data are written to the intensive flash drive and the number of times the data are written to flash drives to which data are not written intensively (the flash drives other than the intensive flash drive). For example, if "a" is stored in the relevant entry of the set value 500B corresponding to the intensive ratio pattern 520 and the ratio of the number of times the data are written to the four flash drives is "2:1:1:1," information "1" is stored in the relevant entry of the set value 500B of the non-intensive drive ratio 540.

The post-drive-replacement operation policy 550 is information indicating an operation policy after any flash drive of the flash drives FD1 to FDn is replaced with a new flash drive. Information indicating "A" or "B" is stored in the relevant entry of the set value 500B of the post-drive-replacement operation policy 550.

If any flash drive of the flash drives FD1 to FDn is replaced with a new flash drive, "A" is information meaning that the CPU 30 executes data write processing in the normal mode also on the new replacement flash drive until the number of times of data write exceeds the threshold value; and if the number of times the data are written to the new flash drive exceeds the threshold value, the data are written intensively to the new flash drive.

On the other hand, if any flash drive of the flash drives FD1 to FDn is replaced with a new flash drive, "B" is information meaning that the CPU 30 writes data to the new flash drive in the intensive mode after the drive replacement.

Figure 7:
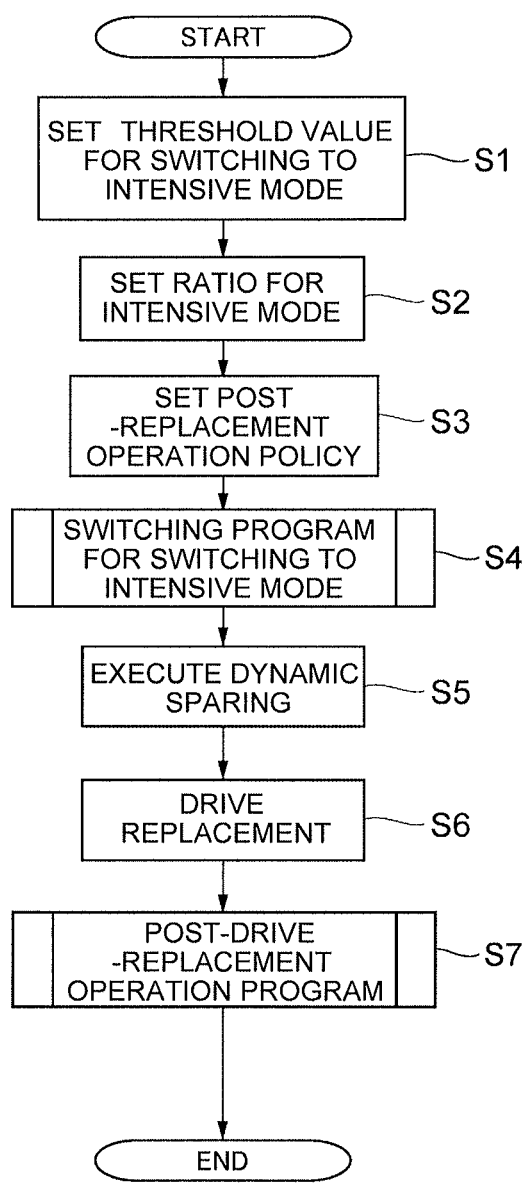
FIG. 7 is a flowchart for explaining processing of the entire storage system.

FIG. 7 is a flowchart for explaining processing of the entire storage system. Referring to FIG. 7, threshold value setting processing (S1) for setting a threshold value to switch to the data write mode from the normal mode to the intensive mode, setting processing (S2) for setting the number-of-times-of-write ratio of the flash drives in the intensive mode, and selection processing (S3) for selecting the operation policy after replacing a flash drive with a new flash drive are executed as initial setting processing by the host 10 or the management server.

In step S1, a value corresponding to the data write ratio of each flash drive, for example, "90%" is set as the threshold value for switching the data write mode from the normal mode to the intensive mode. In this case, "90%" is registered as the threshold value in the relevant entry of the set value 500B corresponding to the intensive switching threshold value 510 of the setting management table 500. Incidentally, an arbitrary value can be set as the threshold value based on a write capacity and usage. Under this circumstance, the threshold value is a value lower than an upper limit value of the number of times data are written to each flash drive, which indicates the life of each flash drive, and should preferably be less than "99%."

When the information about the ratio in the intensive mode is set in step S2, for example, information "a," "2," and "1" are respectively registered in the relevant entry of each set value 500B for the intensive ratio pattern 520, the intensive drive ratio 530, and the non-intensive drive ratio 540 in the setting management table 500. Furthermore, when the post-replacement operation policy is selected in step S3, information "A" or "B" is registered in the relevant entry of the set value 500B corresponding to the post-drive-replacement operation policy 550 in the setting management table 500.

Next, the switch program for switching to the intensive mode (S4) is executed as maintenance processing in the storage apparatus 14; dynamic sparing processing is then executed (S5); and then, processing for replacing a flash drive, whose number of times of data write reaches the end of its life, with a new flash drive is executed (S6); and subsequently, the post-drive-replacement operation program is executed as a program for operating the new flash drive (S7).

When the dynamic sparing processing is executed in step S5, the controller 20 executes processing for saving data stored in a flash drive, whose number of times of data write has reached the end of its life, to a spare drive. So, during that processing, responsiveness to accesses from each host 10 degrades. In other words, performance of the storage system temporarily degrades.

Figure 8:
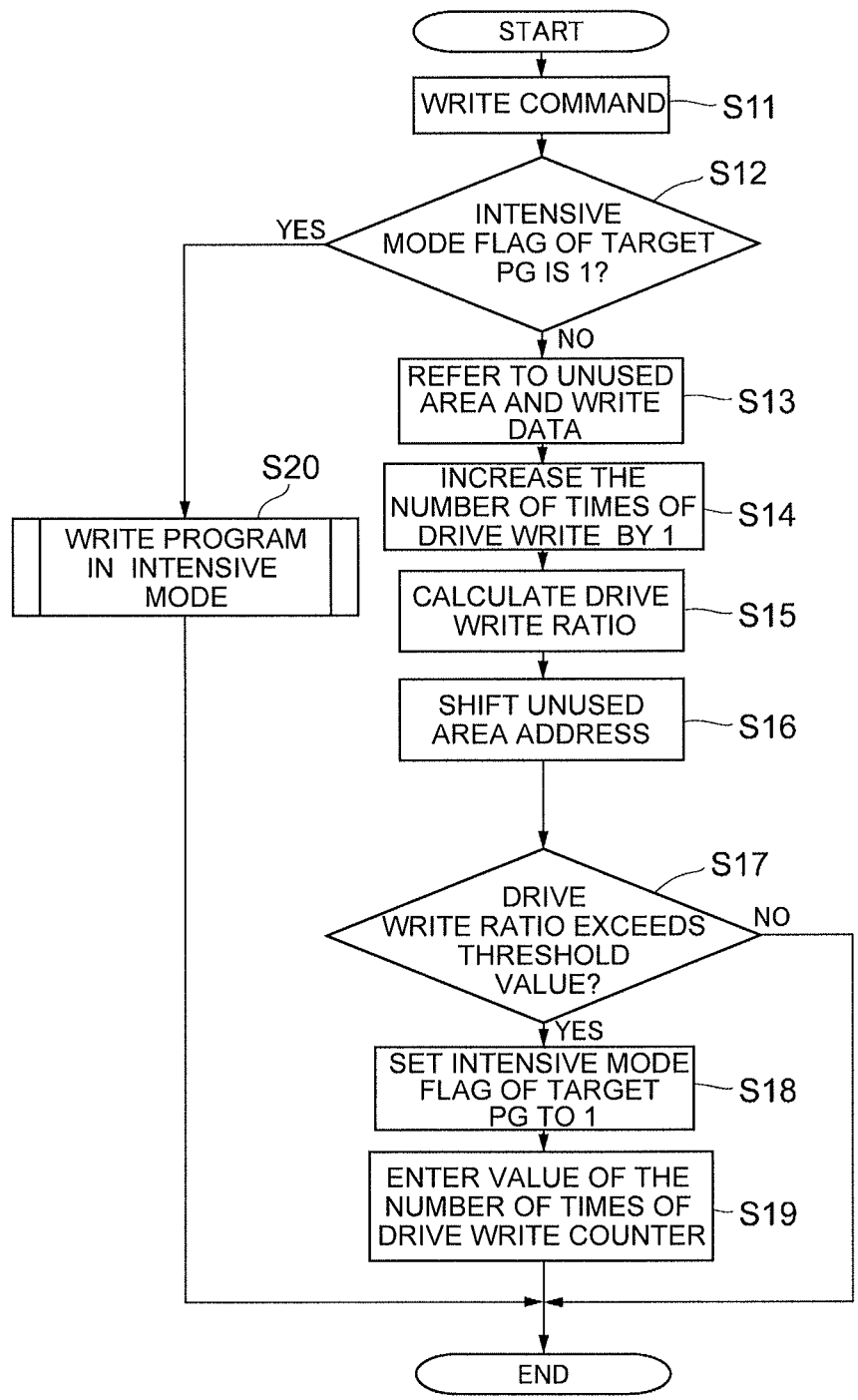
FIG. 8 is a flowchart for explaining processing of a switch program for switching to an intensive mode.

FIG. 8 is a flowchart for explaining the processing of the switch program for switching to the intensive mode. Referring to FIG. 8, this processing is the specific content of step S4 in FIG. 7 and is started by activation of the switching program 100 for switching to intensive mode by the CPU 30.

When the CPU 30 receives a write command by means of write access from the host 10 during the course of data writing in the normal mode of the data write mode (S11), the CPU 30 analyzes the write command and judges whether the intensive mode flag of a parity group (PG) which is a write target is 1 or not (S12). Under this circumstance, the CPU 30 refers to the intensive mode management table 400 and judges whether the intensive mode flag of the parity group which is the write target is 1 or not.

If the CPU 30 obtains a negative judgment result in step S12, that is, if the processing in the intensive mode is not executed on the parity group which is the write target, this means that the parity group intensive mode flag is "0," so that the CPU 30 refers to unused areas of the flash drives belonging to the parity group, which is the write target, and writes data, which are to be processed for the write command, to the unused areas of the flash drives belonging to the parity group, which is the write target, in the normal mode based on the reference results (S13).

Next, the CPU 30 increases the number of times of write of the flash drives belonging to the parity group, which is the write target, by 1 (S14) and calculates the write ratio of the flash drives belonging to the parity group which is the write target (S15). Specifically speaking, the CPU 30 calculates the ratio of the upper limit number of times of write of the flash drives to the number of times of write and registers the calculation result as the write ratio in the drive management table 200. Subsequently, the CPU 30 shifts an unused area address of the flash drive belonging to the parity group, which is the write target, to the next unused area address (S16) and then proceeds to processing in step 17.

Next, the CPU 30 judges whether or not the write ratio of the flash drive belonging to the parity group which is the write target exceeds the threshold value in the normal mode (S17).

If the CPU 30 obtains a negative judgment result in the normal mode in step S17, that is, if it determines that the write ratio of the flash drive does not exceed the threshold value, the CPU 30 terminates the processing in this routine.

On the other hand, If the CPU 30 obtains an affirmative judgment result in the normal mode in step S17, for example, if any of the flash drives belonging to the parity group which is the write target is a flash drive whose write ratio exceeds the threshold value, the CPU 30 sets the intensive mode flag of the parity group, which is the write target, to "1" and updates the information of the intensive mode management table 400 (S18).

Next, the CPU 30 fetches a value of the number-of-times-of-write counter for each flash drive belonging to the parity group, which is the write target, from the number-of-times-of-write counter field 200G of the drive management table 200 and registers a total of the respectively fetched values as a value of the parity group counter in the intensive mode management table 400 (S19) and terminates the processing in this routine.

For example, if flash drives belonging to a parity group #1 are decided as write targets under this circumstance, the CPU 30 fetches "2," "1," "1," "1" as the number-of-times-of-write counter values of the respective flash drives belonging to the parity group, which is the write target, from the number-of-times-of-write counter field 200G of the drive management table 200 and registers a total of the fetched values="5" as the value of the parity group counter in the parity group counter field 400C of the intensive mode management table 400.

On the other hand, if the CPU 30 obtains an affirmative judgment result in step S12, that is, if it determines that the intensive mode flag of the parity group which is the write target is 1, the CPU 30 switches the write mode from the normal mode to the intensive mode and activates the write program 102 in the intensive mode when writing data to the parity group whose intensive mode flag is set to "1" in step S18; executes processing of the write program 102 in the intensive mode (S20); and then terminates the processing in this routine.

Figure 9:
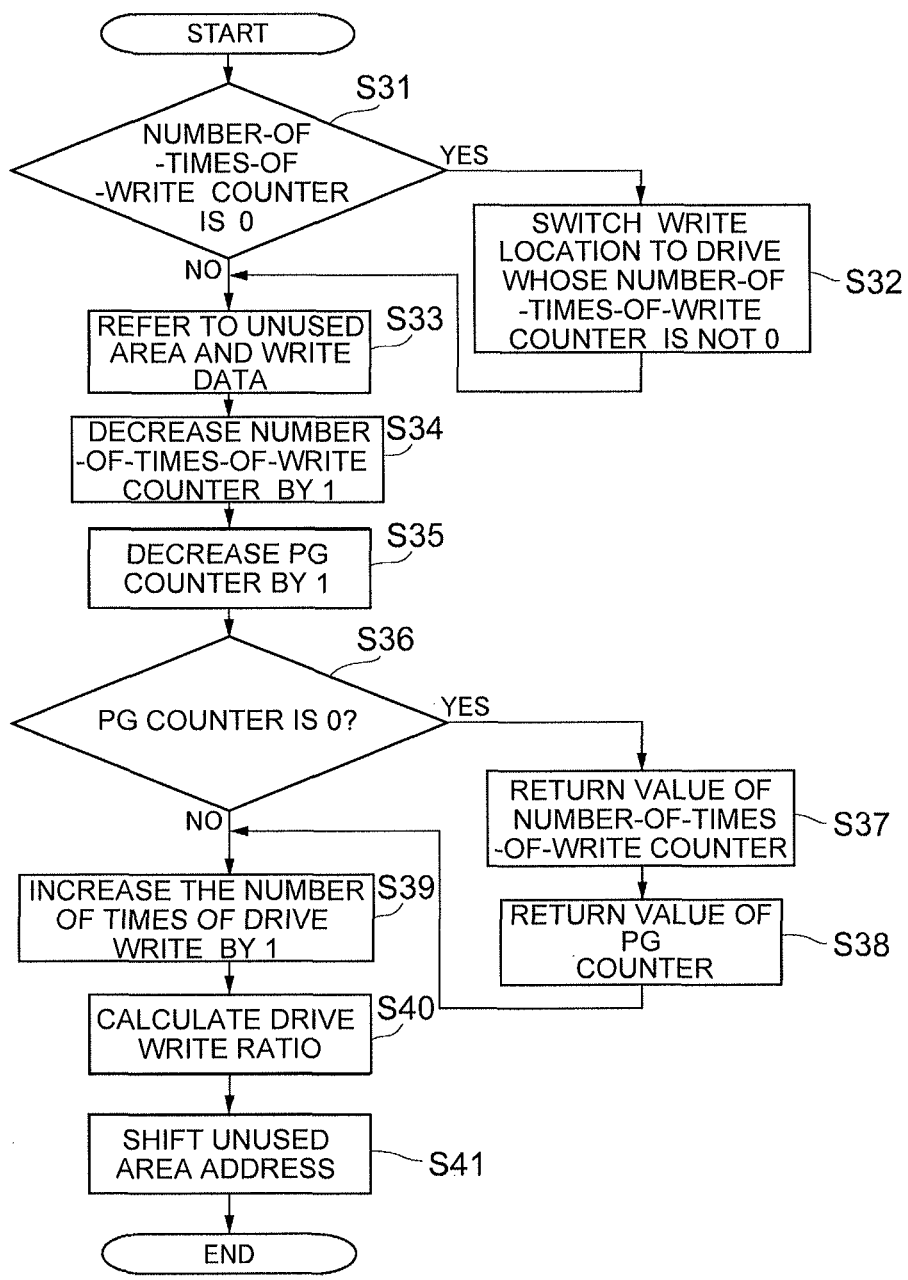
FIG. 9 is a flowchart for explaining processing of a write program in the intensive mode.

FIG. 9 is a flowchart for explaining processing of the write program in the intensive mode. Referring to FIG. 9, this processing is the specific content of step S20 in FIG. 8 and is started by activation of the write program 102 in the intensive mode, which is stored in the local memory 36, by the CPU 30.

When the data write mode is switched from the normal mode to the intensive mode, the CPU 30 refers to the drive management table 200 and judges whether the number-oftimes-of-write counter value of the flash drive, which is a target of the processing in the intensive mode, is 0 or not (S31).

If the CPU 30 obtains an affirmative judgment result in step S31, that is, if it determines that the number-of-times-of-write counter value of the flash drive, which is the target of the processing in the intensive mode, is 0, the CPU 30 switches to a flash drive, whose number-of-times-of-write counter is not 0, as a data write location by means of round robin (S32) and proceeds to processing in step S33.

Under this circumstance, for example, if a parity group which is the target of the processing in the intensive mode is the parity group #1 and data writing is executed twice on a flash drive with the drive number "0" among the flash drives belonging to this parity group and the number-of-times-of-write counter value of this flash drive is updated from "2" to "0" and the number-of-times-of-write counter value of each of the other three flash drives (flash drives with the drive number "1" to "3") is "1," the CPU 30 selects the data write location from the flash drives with the drive number "1" to "3."

If the CPU 30 obtains a negative judgment result in step S31, that is, if it determines that the number-of-times-of-write counter value of the flash drive which is the processing target in the intensive mode is not 0, the CPU 30 selects a flash drive whose number-of-times-of-write counter is not 0 (a flash drive on which data writing has not been completed by the data write processing executed once) or the flash drive selected in step 32 as the data write location, refers to an unused area of the flash drive which is the data write location, and writes the data, which are to be processed for the write command, to the unused area obtained by this reference (S33).

Then, the CPU 30 refers to the drive management table 200, reduces the number-of-times-of-write counter value of the flash drive, which is the data write location, by 1 and updates the information of the drive management table 200 (S34); and then refers to the intensive mode management table 400, reduces the parity group counter value of the parity group to which the flash drive, that is, the data write location belongs by 1, and updates the information of the intensive mode management table 400 (S35).

Next, the CPU 30 refers to the intensive mode management table 400 and judges whether the parity group counter value of the parity group, to which the flash drive, that is, the data write location belongs, is 0 or not (S36). If the CPU 30 obtains an affirmative judgment result in step S36, that is, if writing of the data to the parity group to which the flash drive, that is, the data write location belongs is completed, the CPU 30 returns the number-of-times-of-write counter value of the drive management table 200 to its original value such as "2," "1," "1," "1" (S37), returns the parity group counter value of the intensive mode management table 400 to its original value such as "5" (S38), and proceeds to processing in step S39.

On the other hand, if the CPU 30 obtains a negative judgment result in step S36 or executes the processing in step S38, it increases the number-of-times-of-write value of the flash drive, which is the data write location, by 1, registers the result in the drive management table 200 (S39), calculates the write ratio of the flash drive, which is the data write location, registers this calculation result in the drive management table 200 (S40), shifts an unused area address of the flash drive, which is the data write location, to the next unused area address (S41), and terminates the processing in this routine.

Under this circumstance, for example, if a parity group which is the processing target in the intensive mode for the processing executed for the first time is the parity group #1 and a flash drive with the drive number "0" (a flash drive whose number-of-times-of-write counter value is "2") is selected as the data write location from among the flash drives belonging to this parity group, and as the CPU 30 executes the processing from step S31 to S41, the number-of-times-of-write counter value of the drive management table 200 (the number-of-times-of-write counter value of the flash drive with the drive number "0") is updated from "2" to "1" and the parity group counter value of the intensive mode management table 400 is updated from "5" to "4."

Subsequently, once data writing is executed on all the flash drives belonging to the parity group #1, each number-of-times-of-write counter value of the drive management table 200 (the number-of-times-of-write counter value of the flash drives with the drive number "0" to "3") is updated to "0," the parity group counter value of the intensive mode management table 400 is updated to "0"; and then the number-of-times-of-write counter value of the drive management table 200 is returned to its original value (the value which was set in step S2) and the parity group counter value of the intensive mode management table 400 was returned to its original value (the value which was set in step S2).

Figure 10:
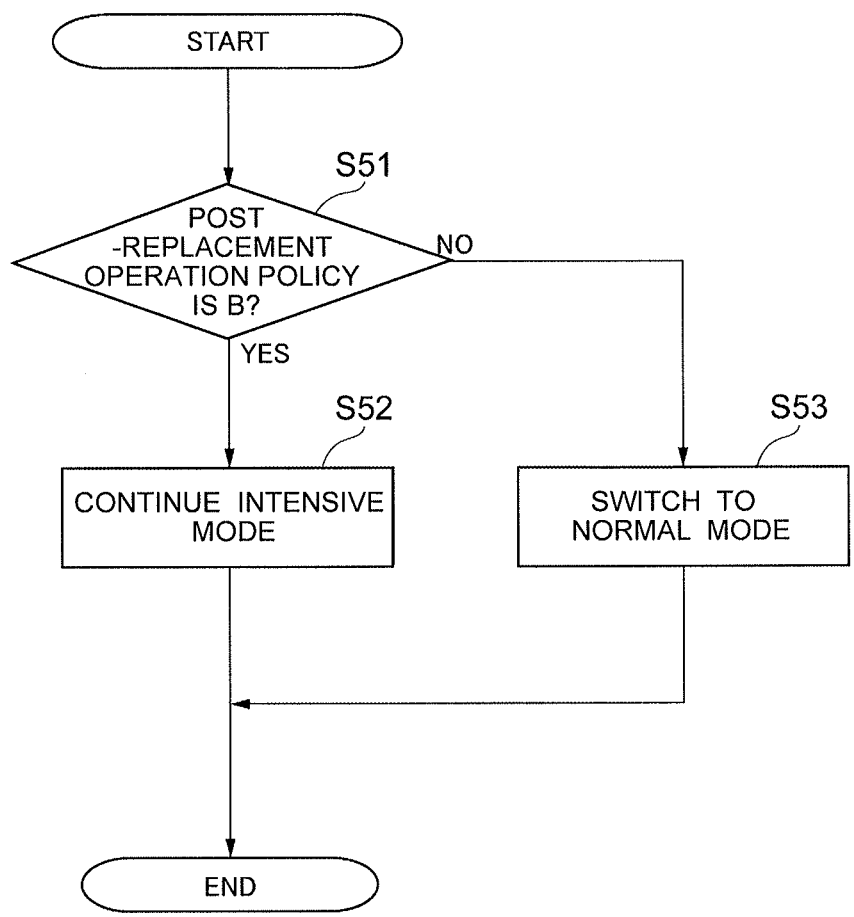
FIG. 10 is a flowchart for explaining processing of a post-drive-replacement operation program.

FIG. 10 is a flowchart for explaining the processing of the post-drive-replacement operation program. This processing is the specific content of step S7 in FIG. 7 and is started by activation of the post-drive-replacement operation program 104, which is stored in the local memory 36, by the CPU 30.

Referring to FIG. 10, when any flash drive of the flash drives FD1 to FDn is replaced with a new flash drive, the CPU 30 refers to the setting management table 500 stored in the shared memory 24 and judges whether the policy of the post-drive-replacement operation policy 550 is "B" or not (S51).

If the CPU 30 obtains an affirmative judgment result in step S51, that is, if the post-replacement operation policy is "B," the CPU 30 continues the processing in the intensive mode (S52) and terminates the processing in this routine. In this case, the CPU 30 can select, after the drive replacement, a new flash drive as a flash drive to be the processing target in the intensive mode and execute the processing for writing the write data of the data, which are to be processed for the write access, intensively to the selected new flash drive. If this processing is selected, the write data are written intensively to the new flash drive after the replacement. So, it is possible to lengthen the lives of the flash drives as a whole and reduce the cost of the flash drives as a whole.

On the other hand, if it is determined in step S51 that the post-replacement operation policy is "A," the CPU 30 switches the data write mode from the intensive mode to the normal mode (S53) and terminates the processing in this routine. In this case, on condition that the number of times of write exceeds the threshold value during the course of writing data to the new flash drive in the normal mode, it is possible to select the new flash drive as a flash drive to be the processing target in the intensive mode and execute the processing for writing the write data of the data, which are to be processed for the write command, intensively to the selected new flash drive. If this processing is selected, it is possible to minimize the performance degradation time and enhance the performance efficiency as the entire system.

This embodiment has described the case where when setting the ratio in the intensive mode in step S2 of FIG. 7, "a" or "b" is selected as the set value 500B corresponding to the intensive ratio pattern 520; however, when setting the ratio in the intensive mode in step S2 of FIG. 7, "c" can also be selected as the set value 500B corresponding to the intensive ratio pattern 520. Under this circumstance, for example, if flash drives belonging to a parity group consist of four flash drives, the number of times data are written to one intensive flash drive (a specified flash drive which is a target of intensive data writing) can be set to "1" and the number of times data are written to each of the other three flash drives can be set to "0." In this case, the ratio of the number of times data are written to the four flash drives is 1:0:0:0. In other words, the write data other than the parity data of the data, which are to be processed for the write command, can be written intensively to only the specified flash drive.

Furthermore, when receiving a write command from the host 10 under a thin provisioning environment, the controller 20 selects an unallocated logical volume from among a plurality of logical volumes stored in a pool, allocates the selected logical volume to a virtual volume which is an access target of the host 10, and writes data to the logical volume allocated to the virtual volume.

Under this circumstance, if a plurality of logical volumes stored in the pool are composed of a plurality of flash drives constituting a RAID group or a parity group and the controller 20 manages unused areas (data blocks) in the plurality of flash drives on a RAID group or parity group basis, the controller 20 cannot write data (write data other than parity data among the data to be processed for the write command) to only the specified flash drive (single flash drive), among the flash drives belonging to the RAID group or the parity group, in the intensive mode. Specifically speaking, if the unused areas of the plurality of flash drives are managed on a RAID group or parity group basis, the controller 20 cannot select the unused areas of only the specified flash drive from among the unused areas of the plurality of flash drives.

So, in this embodiment, even if a plurality of logical volumes stored in the pool are composed of a plurality of flash drives constituting a RAID group or a parity group, the controller 20 manages unused areas of the plurality of logical volumes stored in the pool on the basis of each flash drive; and if it is necessary to write data (write data other than parity data among the data to be processed for the write command) to only the specified flash drive (single flash drive), among the flash drives belonging to the RAID group or the parity group, in the intensive mode, a logical volume composed of an unused area (data block) of the specified flash drive is allocated to the virtual volume.

As a result, even under the thin provisioning, the controller 20 can write data (write data other than parity data among the data to be processed for the write command) to only the specified flash drive (single flash drive), among the flash drives belonging to the RAID group or the parity group, in the intensive mode.

In this embodiment, the write data are distributed and written to each flash device FD1 to FD4 in the normal mode, while the write data are written intensively to the specified flash drive FD1 in the intensive mode. So, it is possible to maintain the lives of all the flash drives for long periods of time and prevent the plurality of flash drives from reaching the end of their lives at the same time.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be added to, or deleted from, or replaced with, the configuration of another configuration.

Furthermore, part or all of the aforementioned configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 host, 12 network, 14 storage apparatus, 20, 22 controllers, 24 shared memory, 26, 28 front-ends, 30 CPU, 32 connecting unit, 34 cache memory, 36 local memory, 38, 40 back-end, and FD1 to FDn flash drives.

The invention claimed is:

1. A storage apparatus comprising:
a plurality of storage devices composed of flash memories; and
a controller for controlling data input to and output from the plurality of storage devices based on access from an access requestor,
wherein when receiving a write command from the access requestor, the controller judges whether a data write mode to be processed for the write command is a normal mode to execute control for distributing and writing the data to each storage device or an intensive mode to execute control for writing the data only to a specified storage device among the plurality of storage devices; and
if it is determined that the data write mode is the intensive mode, the controller selects a storage device, which is to become a processing target in the intensive mode, as the specified storage device from among the plurality of storage devices and writes data, which are to be processed for the write command in the intensive mode, only to the selected specified storage device,
wherein the controller manages the number of times data are written to each storage device on the basis of each storage device; and when the controller receives a write command and if any of the storage devices is a storage device whose number of times of data write exceeds a preset threshold value, the controller determines that the data write mode is the intensive mode and selects the storage device, whose number of times of data write exceeds the threshold value, as the specified storage device.

2. The storage apparatus according to claim 1, wherein the threshold value is set as a value lower than an upper limit value of the number of times data can be written to each storage device, the upper limit value indicating a life of each storage device.

3. The storage apparatus according to claim 1, wherein the controller manages the number of times data are written to each storage device on the basis of each storage device; and when the controller receives the write command and if any of the storage devices is the new storage device, the controller distributes and writes the data, which are to be processed for the write command, to the new storage device on condition that the data write mode is the normal mode; and wherein on condition that the number of times the data are written to the new storage device exceeds the preset threshold value, the controller determines that the data write mode is the intensive mode and selects the new storage device as the specified storage device.

4. The storage apparatus according to claim 1, wherein the controller manages the number of times data are written to each storage device on the basis of each storage device and manages an unused area of each storage device on the basis of each storage device; and when the controller receives the write command and if any of the storage devices is a storage device whose number of times of data write exceeds a preset threshold value, the controller determines that the data write mode is the intensive mode, and selects the storage device, whose number of times of data write exceeds the threshold value, as the specified storage device, searches for an unused area of the selected specified storage device, and writes the write data, which are to be processed for the write command, only to the unused area obtained by the search.

5. A data processing method for a storage apparatus including:
   a plurality of storage devices composed of flash memories; and
   a controller for controlling data input to and output from the plurality of storage devices based on access from an access requestor,
   wherein the controller executes:
   a step of judging, when receiving a write command from the access requestor, whether a data write mode to be processed for the write command is a normal mode to execute control for distributing and writing the data to each storage device or an intensive mode to execute control for writing the data only to a specified storage device among the plurality of storage devices;
   a step of selecting a storage device, which is to become a processing target in the intensive mode, as the specified storage device from among the plurality of storage devices if it is determined that the data write mode is the intensive mode; and
   a step of writing data, which are to be processed for the write command in the intensive mode, only to the selected specified storage device,
   wherein the controller executes:
   a step of managing the number of times data are written to each storage device on the basis of each storage device;
   a step of determining that the data write mode is the intensive mode when the controller receives a write command and if any of the storage devices is a storage device whose number of times of data write exceeds a preset threshold value; and
   a step of selecting the storage device, whose number of times of data write exceeds the threshold value, as the specified storage device.

6. The data processing method for the storage apparatus according to claim 5, wherein the threshold value is set as a value lower than an upper limit value of the number of times data can be written to each storage device, the upper limit value indicating a life of each storage device.

7. The data processing method for the storage apparatus according to claim 5, wherein the controller executes:
   a step of managing the number of times data are written to each storage device on the basis of each storage device;
   a step of distributing and writing the data, which are to be processed for the write command, to the new storage device on condition that the data write mode is the normal mode, when the controller receives the write command and if any of the storage devices is the new storage device; and
   a step of determining that the data write mode is the intensive mode, and selecting the new storage device as the specified storage device on condition that the number of times the data are written to the new storage device exceeds the preset threshold value, when the controller receives the write command and if any of the storage devices is the new storage device.

8. The data processing method for the storage apparatus according to claim 5, wherein the controller executes:
   a step of managing the number of times data are written to each storage device on the basis of each storage device and managing an unused area of each storage device on the basis of each storage device;
   a step of determining that the data write mode is the intensive mode, and selecting a storage device, whose number of times of data write exceeds a preset threshold value, as the specified storage device when the controller receives the write command and if any of the storage devices is a storage device whose number of times of data write exceeds the preset threshold value;
   a step of searching for an unused area of the selected specified storage device; and
   a step of writing the write data, which are to be processed for the write command, only to the unused area obtained by the search.

* * * * *